United States Patent
Rune et al.

(10) Patent No.: US 10,917,845 B2
(45) Date of Patent: *Feb. 9, 2021

(54) METHOD AND ACCESS NODE FOR SUPPORTING UE AS WELL AS A UE AND CORRESPONDING METHOD CARRIED OUT BY THE UE IN A WIRELESS COMMUNICATION SYSTEM

(71) Applicant: Telefonaktiebolaget LM Ericsson (publ), Stockholm (SE)

(72) Inventors: Johan Rune, Lidingö (SE); Icaro L. J. Da Silva, Solna (SE); Andres Reial, Malmö (SE); Henrik Sahlin, Mölnlycke (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,645

(22) Filed: Feb. 12, 2020

(65) Prior Publication Data

US 2020/0187115 A1    Jun. 11, 2020

Related U.S. Application Data

(63) Continuation of application No. 16/082,627, filed as application No. PCT/EP2016/054762 on Mar. 7, 2016, now Pat. No. 10,602,440.

(51) Int. Cl.
*H04W 52/02* (2009.01)
*H04B 7/06* (2006.01)
*H04L 5/00* (2006.01)

(52) U.S. Cl.
CPC ...... *H04W 52/0209* (2013.01); *H04B 7/0617* (2013.01); *H04L 5/0048* (2013.01); *Y02D 30/70* (2020.08)

(58) Field of Classification Search
CPC .......... H04W 52/0209; H04W 72/046; H04W 16/28; H04L 5/0048; H04L 5/005;
(Continued)

(56) References Cited

U.S. PATENT DOCUMENTS 10,602,440 B2 * 3/2020 Rune ................. H04W 52/0209
2002/0146983 A1 10/2002 Scherzer et al.
(Continued)

FOREIGN PATENT DOCUMENTS

EP 2928235 A1 10/2015
WO 2015080645 A1 6/2015

OTHER PUBLICATIONS

Frenger, P., "A Clean Slate Radio Network Designed for Maximum Energy Performance", IEEE Paper of the IEEE 25th Annual International Symposium on Personal, Indoor and Mobile Radio Communication, Sep. 2, 2014, pp. 1-5, IEEE.

*Primary Examiner* — Maharishi V Khirodhar
*Assistant Examiner* — Kenneth P Hunt
(74) *Attorney, Agent, or Firm* — Christopher & Weisberg, P.A.

(57) ABSTRACT

The present invention relates to a method and access node for supporting one or more UEs as well as to a method carried out by a UE and the UE itself which enable to use resource and energy efficiently. The method for supporting one or more user equipments, UEs, in a wireless communication system, comprises transmitting from an access node a first reference signal in a beam; determining whether the access node received at least one indication about a UE's presence in the coverage area of the beam; and switching from transmitting of the first reference signal to transmitting a second reference signal if the access node received at least one indication about a UE's presence in the coverage area of the beam.

16 Claims, 8 Drawing Sheets

(58) Field of Classification Search
CPC ... H04L 5/0051; H04B 7/0617; H04B 7/0417; H04B 7/0408; H04B 7/067; H04B 7/0695; H04B 7/0421; Y02D 70/24; Y02D 70/1262; Y02D 70/26; Y02D 70/444

See application file for complete search history.

(56) References Cited

U.S. PATENT DOCUMENTS

| | | |
|---|---|---|
| 2008/0225796 A1 | 9/2008 | Malladi et al. |
| 2015/0139001 A1 | 5/2015 | Xue et al. |
| 2015/0222345 A1 | 8/2015 | Chapman et al. |
| 2015/0304868 A1 | 10/2015 | Yu et al. |
| 2015/0372736 A1 | 12/2015 | Nammi et al. |
| 2016/0028519 A1 | 1/2016 | Wei |
| 2017/0005712 A1 | 1/2017 | Jiang et al. |
| 2017/0006539 A1* | 1/2017 | Kakishima ........... H04B 7/0639 |
| 2017/0207845 A1 | 7/2017 | Moon et al. |
| 2018/0049141 A1 | 2/2018 | Choi et al. |
| 2018/0063828 A1* | 3/2018 | Wang ................ H04W 72/0413 |
| 2018/0132217 A1 | 5/2018 | Stirling-Gallacher |
| 2019/0021085 A1* | 1/2019 | Mochizuki ........... H04W 72/04 |
| 2019/0230519 A1 | 7/2019 | Xu et al. |
| 2019/0319682 A1 | 10/2019 | Zhang et al. |

\* cited by examiner

① The AN maintains a narrow beam for a UE in an active state.

② The UE is switched to an energy saving state (explicitly or triggered by timeout) and the AN deactivates the narrow beam.

③ The AN activates a collective beam to support the UE.

METHOD AND ACCESS NODE FOR SUPPORTING UE AS WELL AS A UE AND CORRESPONDING METHOD CARRIED OUT BY THE UE IN A WIRELESS COMMUNICATION SYSTEM

RELATED APPLICATIONS

The present application is a continuation of U.S. patent application Ser. No. 16/082,627, which was filed on Sep. 6, 2018, which is a national stage application of PCT/EP2016/054762, which was filed Mar. 7, 2016, the disclosures of each of which are incorporated herein by reference in their entirety.

TECHNICAL FIELD

The present invention relates to a method and access node for supporting one or more UEs in a wireless communication system as well as to a method carried out by a UE and the UE itself. The present invention further relates to a system comprising a UE and an access node as well as computer program, wherein the one or more UEs may be in different states, including an energy saving state.

BACKGROUND

With the ever increasing demands from networked society, either on huge traffic volume or very low latency or both, mobile networking needs to continuously evolve to fulfil the requirements. For example, the Next Generation Mobile Networks Alliance defines requirements for 5G networks (5th generation mobile networks or 5th generation wireless systems) which are new networks surpassing current 4G at least in terms of data rate, number of simultaneous connections and spectral efficiency.

Some consensus is reached about how to meet the requirements for the next generation of 3GPP systems, i.e. 5G systems. A first proposal is to densify the network, and a second proposal is to use more spectrum. Due to scarcity of the so far used, typically most attractive spectrum ranges, the bulk of the available frequencies for next generation (5G) networks that are practically usable may be located in very high frequency ranges, compared to the frequencies that have so far been used for wireless communication, such as 10 GHz and above.

For such high frequency spectrum, the atmospheric attenuation, penetration and diffraction properties are much worse than for the lower frequency spectrum. In addition, the receiver antenna aperture, as a metric describing the effective receiver antenna area that collects the electromagnetic energy from an incoming electromagnetic wave, is frequency dependent, i.e., the link budget would be worse for the same link distance even in a free space scenario, if omnidirectional receive and transmit antennas are used. This motivates the usage of beamforming to concentrate the energy to compensate for the loss of link budget in the high frequency spectrum.

In addition to the usage of beamforming, reducing energy consumption in radio networks is an overall design criterion for 5G systems. As exemplary background, the IEEE paper of the IEEE 25th Annual International Symposium on Personal, Indoor, and Mobile Radio Communication (PIMRC), 2-5 Sep. 2014, Washington, D.C., USA, pp. 1300-1304 "A Clean Slate Radio Network Designed for Maximum Energy Performance" by Pal Frenger, Magnus Olsson, and Erik Eriksson (ISBN 978-1-4799-4912-0) proposes a clean slate radio network system that has been designed with the aim to maximize energy performance and assumes a logical separation between idle mode network functionality and user plane data transmission and reception.

In particular, some of the previous research in this area considers as a design goal the minimization of the amount of "always-on" signals, such as synchronization signals, e.g. the primary synchronization signal (PSS) and the secondary synchronization signal (SSS), the cell-specific reference signals (C-RS) and the broadcasted system information in the 4G (LTE) system. In general, it is proposed to minimize the amount of information over the air interface not directly associated with the transmission of data. This requirement may lead to challenges associated with system access, specifically for 5G, because these "always-on" signals are so called common signals/channels used for system access procedures. For example, in LTE a UE (User Equipment) needs to detect PSS/SSS in order to camp on a cell and get time and frequency synchronization before it can receive C-RSs, perform channel estimation and read system information. In order to be capable of accessing the system when coming from idle mode, the UE needs to acquire the RACH configuration from SIB2 (system information block 2). In summary, minimizing always-on signals should be carefully considered in the design of system access procedures.

When, for example, considering the new 5G system, the usage of beamforming and the aimed minimization of always-on transmissions will lead to new problems especially in the case the UE needs to rely on common signals typically always on (contradicting the energy efficiency requirements) and broadcasted (challenging to be realized in a beamforming-based system). The evolvement in transmission of reference signals today to not "always on" reference signals in an ultra-lean system as well as minimization of broadcasted system information is outlined in FIG. 1. This ultra-lean design drives the minimization of always-on signals.

Mobile communication systems are known to have different operation states and usually have some kind of energy saving state, often also referred to as "idle state" or "dormant state", where the UE procedures are optimized to reduce the UE's energy consumption. To achieve that goal and at the same time enable that the UE in the energy saving state can still be reached by the network, the UE can move around within a defined coverage area, e.g. a multi-cell area defined by a tracking area list in LTE, without informing the network of its whereabouts. The UE still needs to listen for transmissions from the network in this state, in order to measure the signal quality, perform cell re-selection, when needed, read system information, monitor paging channels and send location area updates so that it can be reached by the network. The network provides the signals for the UE to measure on (as well as the system information) through continuously and often frequently repeated broadcasted transmissions. In the case of LTE, the energy saving state optimized for UE battery savings is the RRC_IDLE/ECM_IDLE state. In that state the UE basically listens to PSSs/SSSs that encode the physical cell identity (PCI), enabling the UE to detect the cell, perform cell reselection (without the need to report to the network) and read the system information to detect whether tracking area updates are needed. Based on the PCI the UE can derive the cell-specific reference signal (C-RS) configuration and perform channel estimation in order to decode the system information.

It is desirable that new systems, such as 5G systems, also comprise some kind of energy saving state(s), which for instance could be denoted "idle" and/or "dormant", wherein the UE should remain most of the time in a low-power, energy efficient mode by reducing the amount of measurements to be performed, channels to be monitored and reports to be sent to the network. A generic state with at least some of these or similar properties is herein referred to as "energy saving state". Surely, even if the system does not require a UE to enter into a specifically defined energy saving state, resources, such as battery power, may be saved, if the amount of signaling can be reduced in an active state or other similar operation state.

The above described desire for an energy saving UE state may have conflicting requirements with the assumption that a 5G system will have mostly dedicated transmissions (i.e. UE-specific) and activated on a per-need basis or on-demand basis to fulfil requirements on energy efficiency.

If in addition to the lean design principle addressed-above beamforming is also desired so that additional challenges may exist. As beamforming is used to concentrate the energy to enable and/or improve communication between an Access Node (AN) and a UE, a beam preferably has to be targeting a single UE at a time. Such UE specific beams are preferably activated on a per-need basis (according to the lean design principle), but a possible alternative may be to have a set of fixed beams more or less always active. The UE specific beams rely on frequent feedback from the UE to support the adaptation or replacement of the beam to follow the UE's movements. Such frequent feedback counteracts the purpose of the energy saving state to save energy and battery charge in the UE.

In addition, maintaining such beams for a significant number of UEs in an energy saving state is demanding for the network and may consume a significant amount of its capacity, especially in the case of systems with limited beamforming capability, such as systems using analog beamforming. On the other hand, continuous frequently repeated transmissions to support UEs in energy saving state in the manner of legacy systems counteract the requirement, e.g. in 5G networks, to be energy efficient.

It is thus desirable to provide methods, an access node, user equipment, a system and a computer program to enhance resource and energy efficiency in a network and particularly in a UE.

SUMMARY

Suitable methods, access node, UE, system and computer program are defined in the independent claims. Advantageous embodiments are defined in the dependent claims.

In one embodiment, a method, e.g. carried out by an access node (AN), for supporting one or more UEs in a wireless communication system comprises transmitting from an access node a first reference signal in a beam and determining whether the access node received at least one indication about a UE's presence in the coverage area of the beam. Subsequently, if the access node received at least one indication about a UE's presence in the coverage area of the beam, the transmission of the first reference signal is switched to a transmission of a second reference signal. Accordingly, resources can be saved, e.g. tracking of individual UEs can be avoided, and energy efficiency in a network can be improved. For example, a network node, such as the AN, does not have to maintain continuous, frequently repeated transmissions of reference signals. Hence, a resource efficient and energy efficient way may be provided to support an energy saving state, for example, which benefits both the network and the UE.

In one embodiment, a method carried out by a UE in a wireless communication system, comprises receiving reference signals in a beam from an access node and determining whether at least two consecutively received reference signals indicate a switch from a first reference signal to a second reference signal. If a switch is determined, a time period is adapted, e.g. determined and set by a timer, so that after the expiration of the time period an indication about the UE's presence in the coverage area of the beam is transmitted. Accordingly, resources can be saved, e.g. frequent feedback signals from a UE are avoided, and energy efficiency in a UE is improved. For example, a UE can be supported in an energy saving state and battery savings can be provided, while avoiding the above described problems. In particular, the switching from the first to the second reference signal can be used to suspend the transmission of an indication about a UE's presence from one or more UEs in the coverage area of the AN, e.g. by resetting a timer in a monitoring state.

In one embodiment, an access node (AN) is provided supporting one or more UEs in a wireless communication system. The AN comprises a transmitter configured to transmit a first reference signal in a beam and a determination unit. The determination unit is configured to determine whether the AN received at least one indication about a UE's presence in the coverage area of the beam. The access node further comprises a controller configured to control switching from the transmission of the first reference signal to a transmission of a second reference signal if the AN received at least one indication about a UE's presence in the coverage area of the beam. Accordingly, resources can be saved, e.g. tracking of individual UEs can be avoided, and energy efficiency in the AN can be improved. For example, the AN does not have to maintain continuous, frequently repeated transmissions. Hence, a resource efficient and energy efficient way may be provided to support an energy saving state, for example, which benefits both the network and the UE.

In one embodiment, a UE of a wireless communication system comprises a receiver configured to receive reference signals in a beam from an access node. Additionally, the UE comprises a determination section which is configured to determine whether at least two consecutively received reference signals indicate a switch from a first reference signal to a second reference signal. Further, a UE timer is provided in the UE, which, if a switch is determined, adapts a time period. After the expiration of the time period, an indication about the UE's presence in the coverage area of the beam is transmitted. Accordingly, resources can be saved, e.g. frequent feedback signals from a UE are not need, and energy efficiency in the UE is improved. For example, the UE can be supported in an energy saving state and battery savings can be provided. In particular, the switch from the first to the second reference signal can be used to suspend the transmission of an indication about a UE's presence from one or more UEs.

In another embodiment, a system is provided comprising the above-described elements of the access node, namely a transmitter, a determination unit and a controller, and/or the above-described elements of the UE, namely a receiver, a determination section and a UE timer.

In another embodiment, a computer program is provided which includes instructions configured, when executed on a processor, to cause the processor to carry out the above-described methods.

Further, advantageous embodiments of the invention are disclosed in the dependent claims.

DETAILED DESCRIPTION OF THE EMBODIMENTS

Further embodiments of the invention are described with reference to the figures. It is noted that the following description contains examples only and should not be construed as limiting the invention.

In the following, similar or same reference signs indicate similar or same elements or operations.

Figure 1:
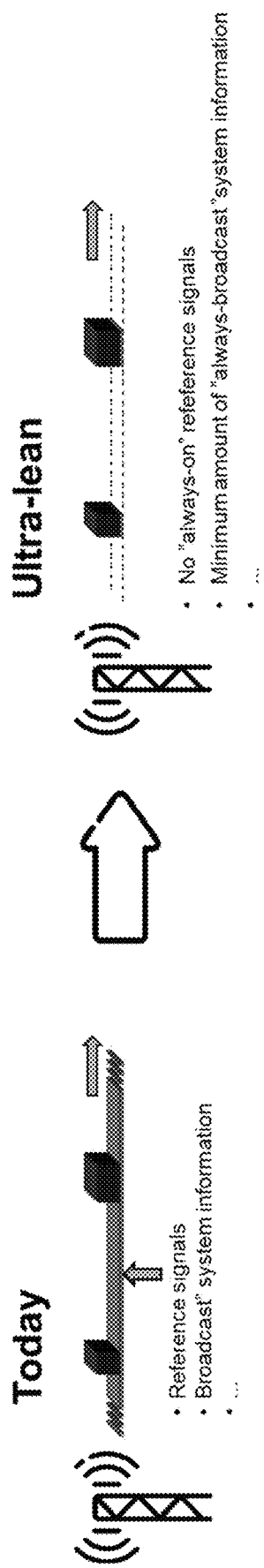
FIG. 1 illustrates a schematic drawing explaining an ultra-lean design.
Figure 2:
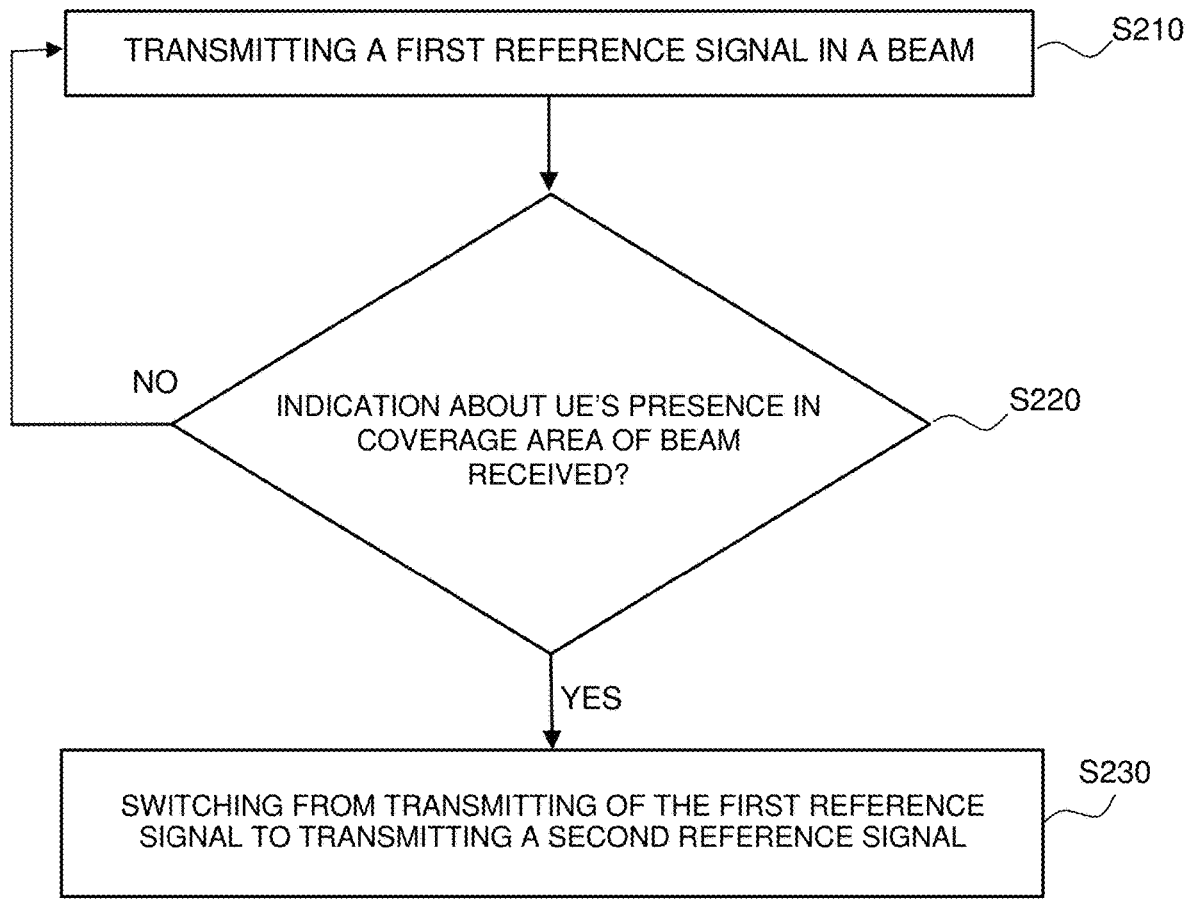
FIG. 2 illustrates operations of a method for supporting one or more UEs in a wireless communication network according to an embodiment.

FIG. 2 illustrates a flowchart of a method for supporting one or more UEs in a wireless communication system. The operations, also referred to as steps in the following, of the method may be carried out by at least one node of a wireless communication system, e.g. an access node (AN). For example, the functions described in FIG. 2 can also constitute functional elements in a node, which will be discussed with respect to FIG. 8A later. In the reference signs of the flowcharts, step is indicated as "S" followed by the step number.

As will be understood from the following discussion, a particularly useful state in which a UE may be supported by the method of FIG. 2 is the above-mentioned energy saving state also referred to as "idle state" or "dormant state" before. The user equipment (UE) described herein may be any type of terminal like a mobile phone or other kind of terminal, e.g. smartphone, tablet computer, laptop, Personal Digital Assistant (PDA), wearables, etc. Most notably, the UE is not limited thereto and may be any wirelessly controllable, intelligent device, including modern kitchen appliances, indoor climate control devices, home entertainment equipment, etc., which can be connected to a wireless network, like in the internet of things.

As can be seen in FIG. 2, the method in the wireless communication system comprises a step 210 in which a first reference signal in a beam is transmitted. The wireless communication system is preferably a beam-based wireless communication system supporting an omnidirectional beam and one or more directional beams. Nevertheless, the presented methods apply to any beam form including omnidirectional beam, directional beam or any type of sector transmission which are well known in antenna design in telecommunications. Depending on the shape of the beam(s), the coverage area(s) of the beam(s) in which downlink and uplink information can be exchanged between AN and UE will differ.

The reference signal (RS) transmitted in the beam as downlink information, can be any signal supporting an UE, particularly an "idle" UE, in different functions, such as mobility control, provision of channel information or/and synchronization information. Thus, there are different types of RSs, such as Mobility Reference Signals (MRS) or Time Synchronization Signals (TSS), e.g. SSS and PSS. Another type of RS is the cell-specific reference signal (C-RS). Accordingly, the reference signal of these embodiments, also abbreviated as RS, should be understood as a UE support signal, particularly supporting a UE in an energy saving state. The same RS can be repeatedly or even periodically transmitted in the beam.

In step 220, it is determined whether the AN received at least one indication about a UE's presence in the coverage area of the beam. For example, the AN itself may determine whether it received as uplink information, e.g. uplink message, an indication from a UE that the UE is present in the area covered by the beam. Alternatively, the uplink information may be provided to another network element which may be located in the core network and analyses whether the received uplink information comprises an indication about a UE's presence. The indication may also be sent by UE in the idle (not connected) state, when the UE is in an energy saving state. If the indication is provided in a message or as a message from the UE, this message may specify the UE based on identification information, e.g. by means of a dedicated sequence, or may indicate beam quality (presence reporting augmented with beam quality). UE presence reporting will be discussed in more detail below so that the detailed aspects regarding UE presence reporting should be understood as a part of the disclosure of FIG. 2 as well as in the same way of FIGS. 6 and 7.

If it is decided in step 220 that an indication is not received, the process flow returns to step 210 and the same RS, i.e. the first RS, can be transmitted again in the beam.

On the other hand, if it is decided in step 220 that an indication is received, the process flow moves on to step 230. In step 230, it is switched from transmitting the first RS to transmitting a second RS. In other words, if the AN received an indication about a UE's presence or even several indications from several present UEs, the AN does not return to step 210 and transmits the first RS again but transmits a second RS which is different to the first RS.

In particular, in step 230 the beam is maintained for a predetermined time period if a UE's presence is detected by the received indication so that it is possible to repeatedly transmit the same second RS. In one example, the steps 210 to 230 are repeated with the second RS until a new indication is received, which triggers the transmission of a third (or again the first) RS. Otherwise if maintenance of the beam is not desired anymore, for example after expiration of the time period, the beam is deactivated, which is explained further below.

Preferably, the first RS and the second RS are different signals of the same type, e.g. two different MRSs. For example, MRSs could consist of Zadoff-Chu sequences, and two different MRSs would have two different Zadoff-Chu sequences. Surely, two RSs of two different types, such as TSS and MRS, are also considered two different RSs.

The indication may simply be a dedicated sequence. This sequence may be standardized and thus hardcoded in the UE or conveyed to the UE through other means, e.g. configuration in the Universal Subscriber Identity Module (USIM) or indicated in system information. In such cases it may be omitted in instructions related to the beam (see Step 304 of FIG. 3). For example, the dedicated sequence could be a random access preamble in the form of a Zadoff-Chu sequence.

Figure 3:
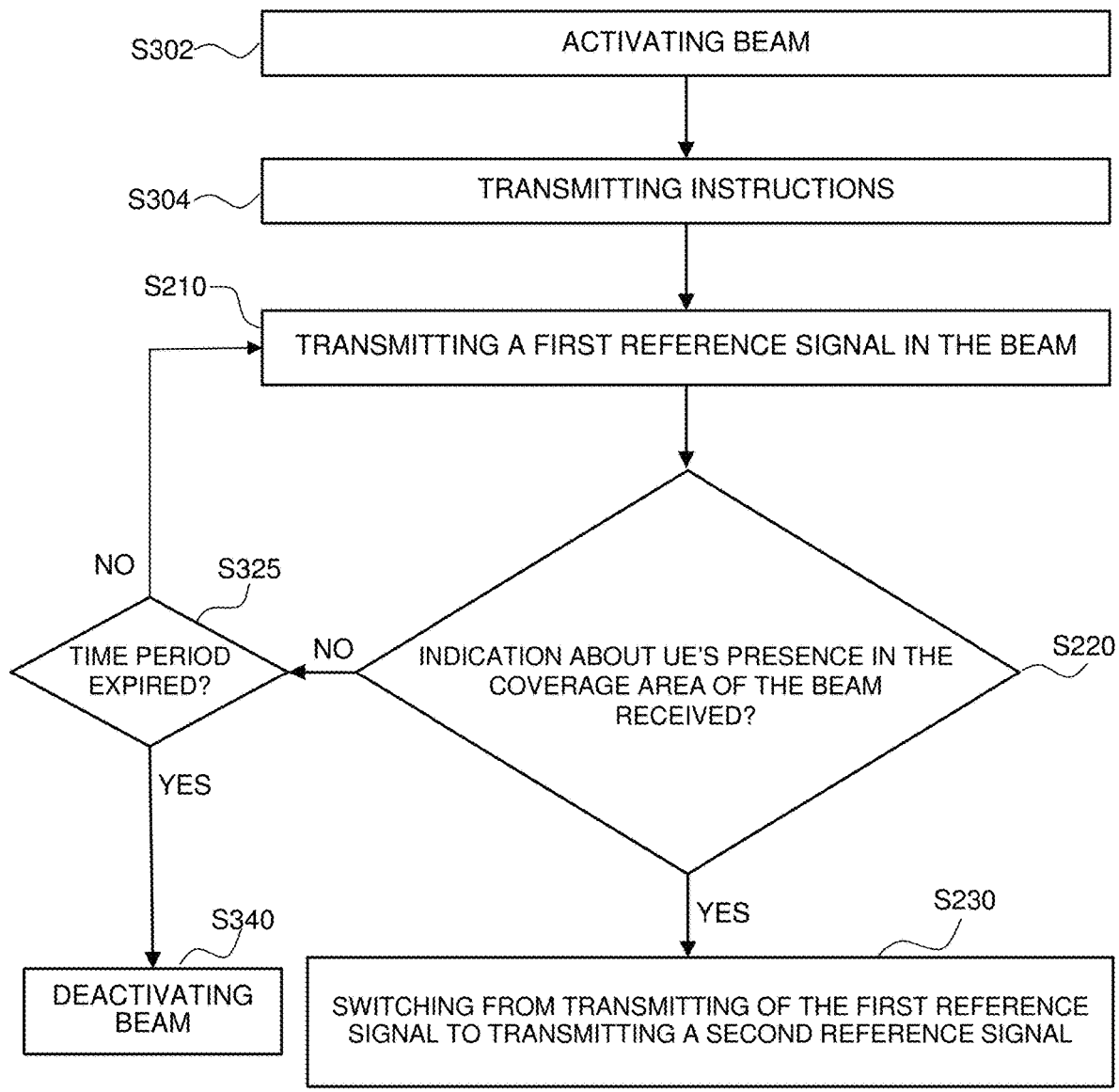
FIG. 3 illustrates operations of a method for supporting one or more UEs in a wireless communication network in more detail.

The example discussed with respect to FIG. 2 above, will now be explained in more detail by referring to FIG. 3. FIG. 3 is a flow diagram describing steps of a specific embodiment in detail also including the above steps 210, 220 and 230 which will not be explained in detail again.

In FIG. 3 details about the decision making whether when no indication is received in step 220 the first RS is transmitted again in the beam or not are discussed. As can be seen in the figure, a decision step 325 can be provided, in which it is determined, if no indication is received in step 220, whether the first RS is transmitted again or whether the beam is deactivated in step 340. That is, if no indication about a UE's presence in the coverage area is received within a predetermined time period, the beam is deactivated. For example, a timer, e.g. AN timer, is set to a predetermined time period while steps 210 and 220 are continuously performed. In a specific example, the first RS may be transmitted repeatedly, e.g. 10 times, without receiving an indication from a UE. Consequently, the AN may determine that a time period expired and that there is no UE in the coverage area so as to deactivate the beam after expiration of the time period.

However, it is possible that a UE enters at some later time the coverage area and is missed by the AN because the beam is deactivated. Therefore, it is useful to activate the beam from time to time and transmit one or more RSs and listen to presence indications from UEs. For example, as shown in step 302, the beam is activated for reference signal transmission, either sporadically or periodically, for a predetermined time period to check for a UE's presence.

Figure 4:
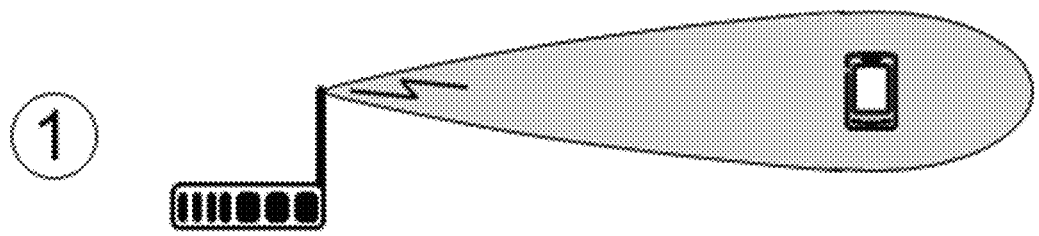
FIG. 4 explains the concept of activating a collective beam for supporting a UE in energy saving state.
Figure 4:
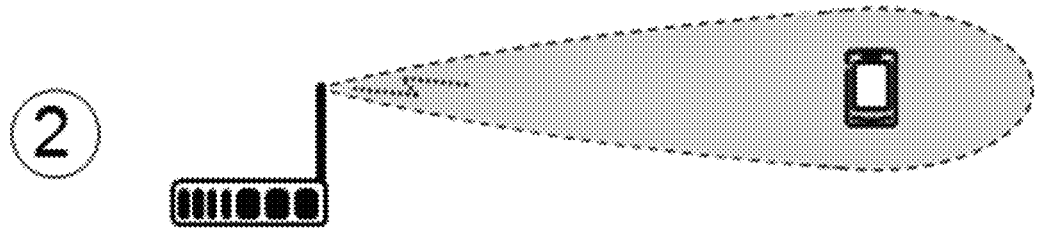
Figure 4:
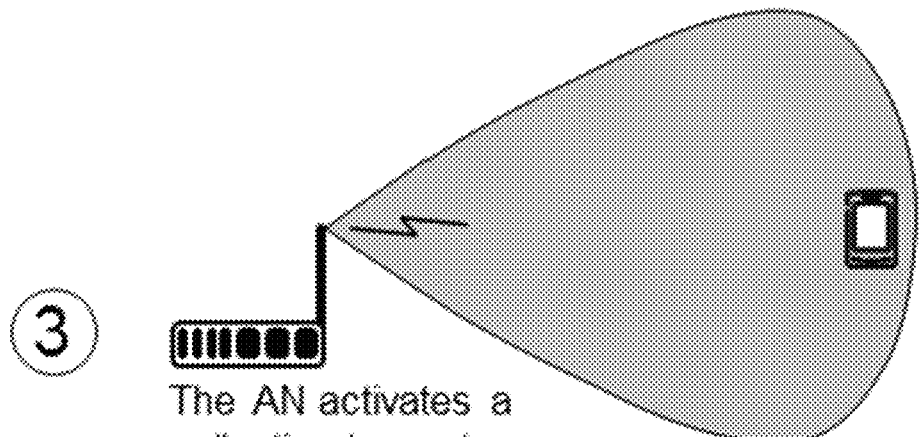
Figure 5:
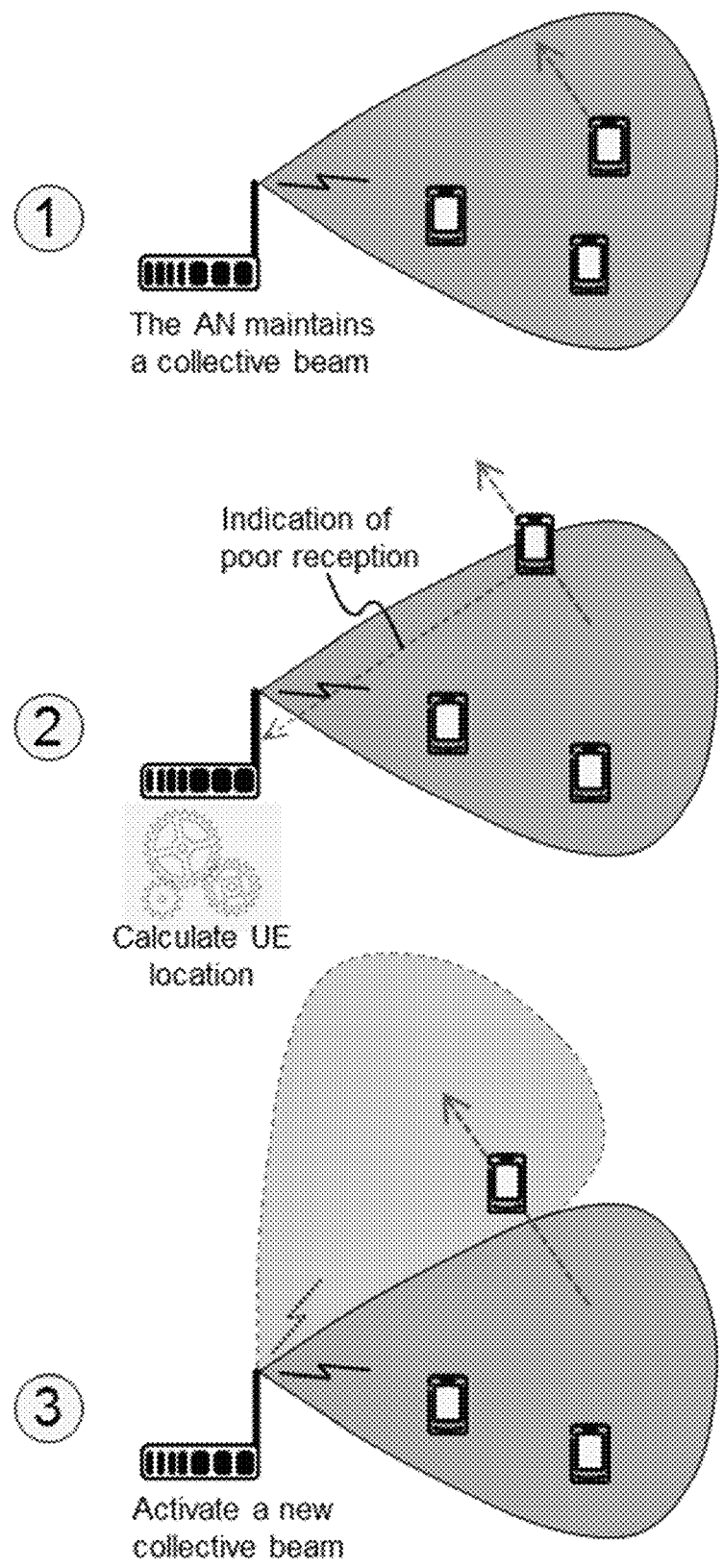
FIG. 5 explains the concept of activating a new collective beam for supporting a UE in energy saving state.

There are several other reasons which could lead to activation of the beam as shown in step 302 of FIG. 3 and explained with respect to FIGS. 4 and 5. For example, activation of the beam for reference signal transmission may be based on at least one of knowledge of the UE's location, an indication that another beam with poor reception already exists for the UE and a request of the UE for activation of the beam.

The activation of the beam for reference signal transmission based on the knowledge of the UE's location will be discussed below with reference to FIG. 4, which shows that a UE switches from its active state into an energy saving state and the AN activates a collective beam to support the UE in the energy saving state. In this case, it is clear that the network is aware of the UE location because the UE was previously in an active state in a beam of the AN. However, it is also possible that the network, e.g. another AN, informs the AN that a new UE might have roamed in its coverage area.

The activation of the beam based on an indication that another beam with poor reception already exists for the UE will be discussed below with reference to FIG. 5. This figure illustrates a UE in an energy saving state on its way out of the coverage area of a collective beam and the UE reports the worsened reception to the AN, which triggers the AN to activate a new beam to support the UE.

The activation of the beam based on a request of the UE for activation of the beam may be realized by designing a scheme by which a UE could request activation of a beam, e.g. collective beam, which is also explained further below.

In the subsequent step in FIG. 3, namely step 304, instructions are transmitted from the AN. For example, instructions may be transmitted to the one or more UEs in the coverage area of the beam, wherein the instructions indicate to the one or more UEs at least one of which reference signals the one or more UEs have to listen to in the beam, e.g. MRSs, TSSs, C-RSs, etc. and when to indicate to the AN UE's presence in the coverage area of the beam. The latter instruction information may be provided to the UE as instruction to use an interval T in periodically sending the indication. This period may also be combined with a randomized time factor t which will be discussed further below. Thus, the UE may be informed how to obtain the time period after the expiration of which the indication to the access node about the UE's presence should be transmitted in the coverage area of the beam.

As explained further below instructions can be sent in an initial control signaling message and may fully or partly be preconfigured in the UE, e.g. through standardization, operator specific pre-configuration, e.g. in the USIM, or through previously received system information. For example, in addition to (or implicitly encoded in) the reference signals, the network, in particular the AN, sends instruction messages, e.g. an initial instruction followed by periodic instruction messages, in the beam, which contain instructions to the UEs related to the beam. The instructions may indicate which reference signals the network will send in the beam and how the UEs should report their presence in the coverage area of the beam.

Figure 6:
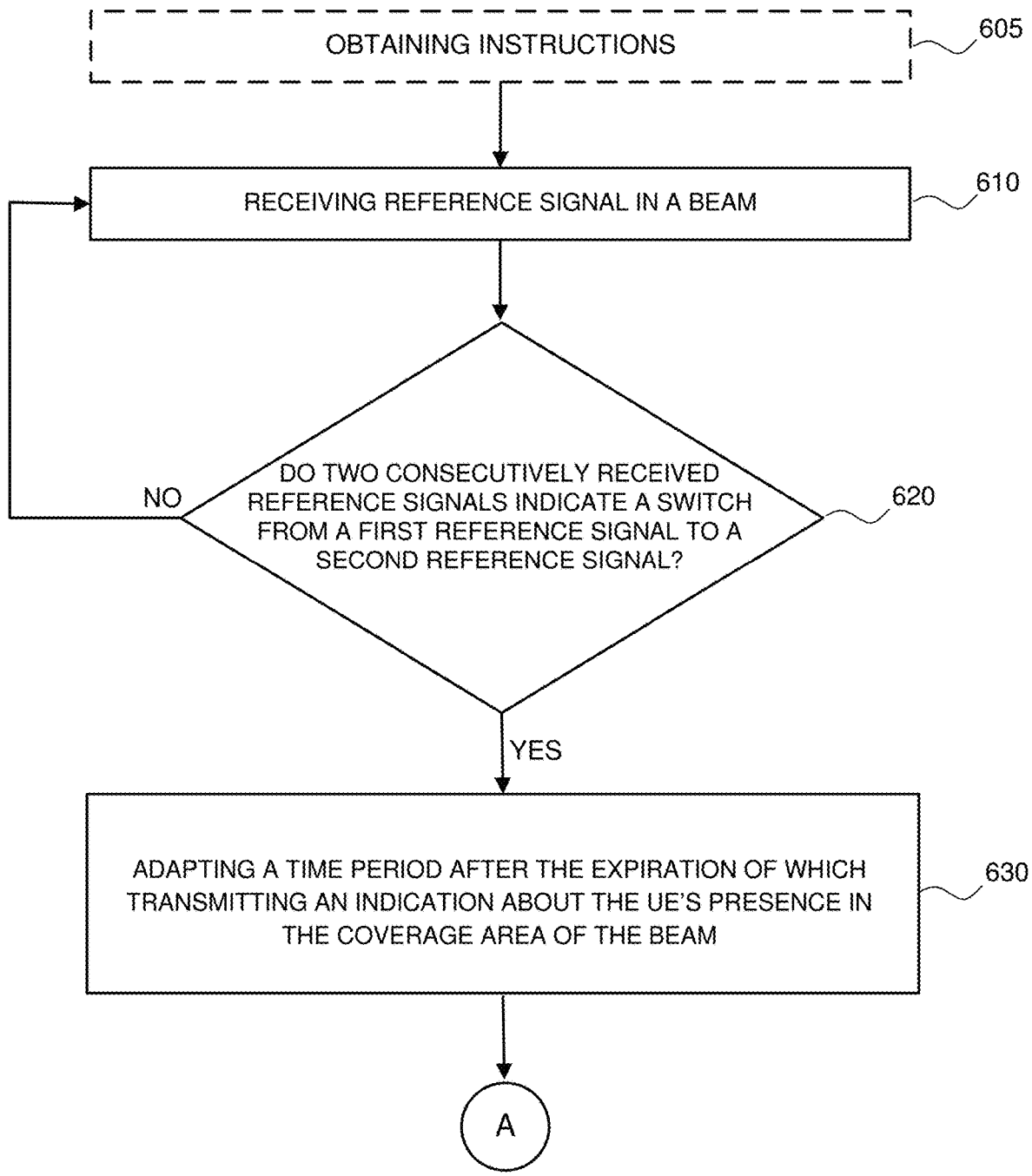
FIG. 6 illustrates operations of a method performed by a UE in a wireless communication network according to an embodiment.
Figure 7:
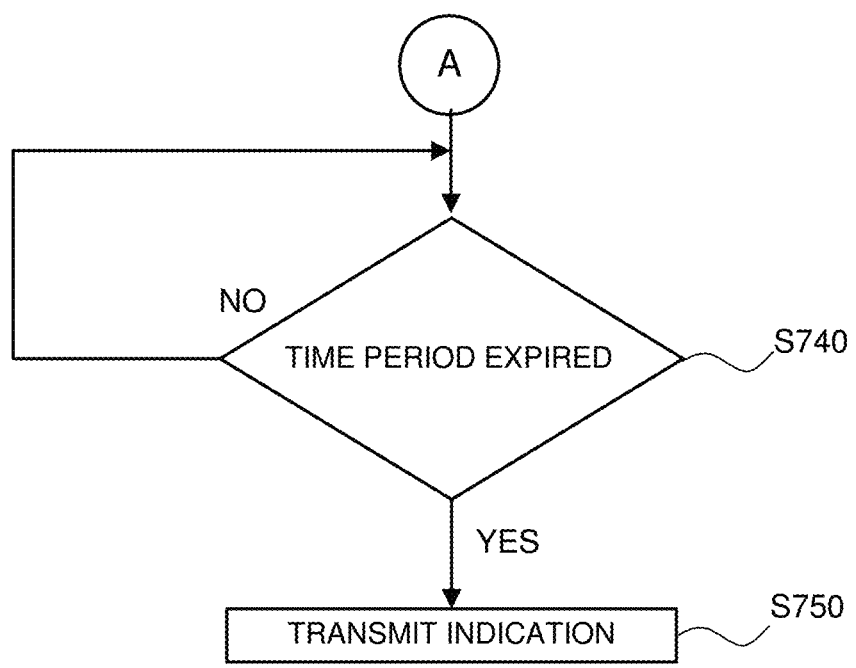
FIG. 7 illustrates additional operations which can be incorporated in the method of FIG. 6.

In the following, the operation of the UE side is discussed. FIG. 6 illustrates a flowchart of a method carried out by a UE in a wireless communication system. As mentioned before, the UE may be in an energy saving state. For example, the functions described in FIG. 6 can also constitute functional elements of the UE, which will be discussed with respect to FIG. 8B later.

As can be seen in FIG. 6, the method of the UE in the wireless communication system comprises a step 610 in which reference signals in a beam are received from an AN, whereas the wireless communication system is preferably a beam-based wireless communication system (but the scheme is also useful in traditional, sector-based deployments for the purposes of determining UE presence in a sector). For example, several first RSs or a first RS and then a second RS may be received since at least two RSs are needed to determine whether the two RSs are the same or not.

This determination is explained with respect to step 620. In step 620, it is determined whether at least two consecutively received reference signals indicate a switch from a first RS to a second different RS. This switch in the RSs received may result from the above mentioned steps 220 and 230 of FIG. 2, in which the AN decided to change the RS to be transmitted to indicate that the AN received an indication about a UE's presence. However, the determination is not limited to two signals, and it is also possible to determine a switch between a first pair of first RSs and a second pair of second RSs, which is explained further below.

As can be taken from FIG. 6, if it is decided in step 620 that two consecutively received reference signals are the same, i.e. no switch from a first RS to a second different RS is indicated, the process flow returns to step 610 and the UE again waits to receive RSs in the beam.

On the other hand, if it is decided in step 620 that there is a switch from a first RS to a second different RS, the process flow moves on to step 630. That is, if a switch is determined, a time period is adapted after the expiration of which an indication about the UE's presence in the coverage area of the beam can be transmitted. Thus, the switching from the first to the second RS has the effect of suspending the transmission of an indication about a UE's presence from one or more UEs in the coverage area.

There are several possibilities of how the UE can adapt the time period, which may be called presence reporting time period. For example, the UE obtains a value, e.g. prestored value or value, such as interval T, from the AN in the instructions, and generates a random value from interval T and the randomized time factor t. Thus, as in the example of FIG. 7, in step 740, it can be determined if the time period, e.g. T+t, expired, and the indication about the UE's presence in the coverage area of the beam can then be transmitted to the AN in step 750 in accordance with the instructions received from the AN. As mentioned above, presence reporting and the UE presence reporting timer will be discussed in more detail below so that the detailed aspects regarding UE presence reporting should be understood as a part of the disclosure of FIGS. 6 and 7.

Optionally, as indicated by the dashed lines in step 605, the UE method may be preceded by the step of obtaining instructions related to the beam transmitted from the AN. Examples of these instructions have been discussed above and the obtaining step may comprise receiving an instruction message from the access node, receiving the instructions in broadcasted system information, retrieving instructions from internal storage, e.g. the USIM, and deriving the instructions from a received reference signal based on a predefined mapping between the reference signal and a set of instructions. As noted before, instructions may indicate to the UE which reference signal or signals the UE has to listen to in the beam, and/or how to obtain the time period after the expiration of which the indication to the access node about the UE's presence is transmitted in the coverage area of the beam.

However, as mentioned above, the beam of the AN may not always be active so that the UE may first inform the AN to activate the beam for reference signal transmission. This can be achieved by providing an indication about the UE's presence in the coverage area of the beam, an indication that another beam with poor reception already exists for the UE and/or an explicit request of the UE to activate the beam.

According to the above, the problems in the art are addressed and solutions are proposed which comprises beam based transmissions of RSs to UEs, and particularly UEs in an energy saving state, but preferably only when one or more UEs are present in the coverage area of the beam. As is evident from the above, the feedback signaling burden of a UE is limited, since the UEs in the coverage area may wait to indicate their presence and may randomly take turns to report UE presence to the network once they detect a switch. Hence, radio resources and energy are conserved in both the UE and the network.

In the following, the beam is also referred to as a "collective beam" which can be used for multiple UEs at the same time. The term "collective beam" thus refers to the beam's purpose of providing transmission to multiple UEs covered by the beam. A collective beam is typically a rather wide beam and may also be omnidirectional.

It is discussed above and in more detail below that the AN uses two reference signals in a, preferably collective, beam, but only one reference signal at a time, wherein UEs report their presence governed by a UE (presence reporting) timer, for example, having a random length within a time span indicated in the instructions. When the UE timer expires it reports its presence by sending a certain sequence (which preferably has been indicated in the instructions) to the network. Triggered by the reception of such a UE presence indicating sequence, the network, in particular the AN, toggles from one reference signal to the other and keeps transmitting the new (second) reference signal until the next presence indication is received, which then causes the network to toggle back to the first RS or to a third RS. When a UE detects such a toggling between reference signals, it restarts its timer, e.g. at a new random value. This way only one UE has to report its presence during each reporting interval, irrespective of how many UEs are present in the coverage area of the collective beam. Absence of presence indications for a certain number of reporting periods will cause the network to cease transmitting the reference signals in the collective beam, i.e. the network deactivates the collective beam.

These methods support UEs in an energy saving state and allow both the network and the UE to conserve energy. In particular, frequent feedback from each UE is avoided, tracking of individual UEs is avoided and the network does not have to maintain continuous, frequently repeated transmissions.

In the following the properties of the beam and the nature of the RSs are discussed in more detail. To support UEs in energy saving state the network sends a preferably relatively wide beam, e.g. a sector-wide beam or even an omnidirectional beam depending on the deployment scenario with repeated RSs. As mentioned above, the RS may be any kind of signal supporting different function for an UE, such as a TSS or MRS.

As noted above, the first RS and the second RS are different signals, e.g. two different MRSs, wherein a MRS is a sequence (or a combination of two or more sequences) of bits or waveforms. These sequences should have suitable autocorrelation and cross-correlation properties. One example of a sequence is a Zadoff-Chu sequence, another one is a differential-coded Golay sequence. The MRSs are formed by the same type of sequence, but the actual sequence differs between different MRSs. For example one MRS comprises a first set of Zadoff-Chu sequences, and the other (different) MRS comprises a second set of Zadoff-Chu sequences. Accordingly, the two RSs have different identities or characters and thus can be easily distinguished by the receiving UE(s). In the same or similar way, other RSs can at least be distinguished by their different identities or characters. In another embodiment, instead of distinguishing the first and second RSs by their sequences, they may be distinguished by their location in the time/frequency grid.

In a specific example, when activating the (collective) beam, the AN sends a common control signaling message detectable by a group of UEs, e.g. addressed with a certain label, e.g. a RNTI (Radio Network Temporary Identifier) in the LTE terminology or implicitly encoded in the reference signals, which all UEs in the energy saving state should listen for and decode as intended for them. Encoding in the sense that a reference signal can be mapped to a certain set of instructions, is elaborated on below. The control message is thereafter preferably periodically repeated in the beam. The control message provides instructions to the UEs that are present in the coverage area of the beam and receive the message.

The control message may include instructions from the AN to the UE. An example for detailed instructions translated in human language may be as follows: "If you (i.e. UE) hear this, it means that you are covered by this collective beam. In this beam I (i.e. AN) will transmit two RSs: RS1 and RS2. Not at the same time, though, but I will toggle between them so you have to listen for both. I want you to periodically report that you are still listening to the beam. I want you to adapt/use a period of T+t, where t is randomly generated in the interval tmin≤t≤tmax (and regenerated for each period). When your timer expires I want you to report to me that you are still present and still listening to the beam. To report, I want you to send the following dedicated sequence (which e.g. could be a random access preamble, e.g. in the form of a Zadoff-Chu sequence). I will not give you any explicit response to this sequence transmission, but I will react by toggling from RS1 to RS2 or vice versa. When you see that the RS has changed (i.e. switched or toggled), you should restart your presence reporting timer irrespective of whether you were the one whose report triggered the toggling".

In reality the instructions in the control message, also referred to as control signalling message, are of course coded in the manner stipulated by the specification of the utilized protocol, e.g. RRC (Radio Resource Control) or MAC (Medium Access Control) in LTE, but the detailed coding of the message is not important here so that the "human language" example is provided for a better understanding.

The above scheme is particularly advantageous if the UEs are in the energy saving state. For example, in energy saving state, the UEs may still listen to messages, e.g. paging messages, during RRC idle state, e.g. in Discontinuous Reception (DRX) in RRC_Idle. In the same way, a DRX configuration for RS reception for the UE may be defined so that at least some messages and RSs can be received. The receiving UEs in energy saving state follow the above instructions and the result is that during each toggling/reporting period only one of the UEs in energy saving state covered by the collective beam has to transmit the presence-indicating sequence, which allows the other UEs to conserve energy. This "toggling/reporting period" refers to the above mentioned predetermined time period between two toggles of the reference signal in the beam or, equivalently, the time period between two presence indications received by the network from UE(s) in the coverage area of the collective beam, wherein these two receptions are separated by at least a time period equal to the minimum time period that the presence reporting timer has to run before it expires.

When the UE's presence reporting timer expires, it may act in two different ways. If it has recently enough received a reference signal in the collective beam and concluded that it has not been toggled, then the UE may immediately—or at the first available reporting occasion—report its presence to the network. What is to be regarded as "recently enough" could be predefined, indicated in an instruction message or be left to the UE implementation. However, a minimum requirement is that the most recent regular RS transmission was received.

If the UE has not received the RS recently enough, it must, upon expiration of the reporting timer, first receive the next transmission of the RS, conclude that it has not been toggled and then immediately—or at the first available reporting occasion—report its presence to the network. Alternatively, or optionally, this UE behavior may be used irrespective of how recently it received a RS before its reporting timer expired.

For the network, in particular the AN, each received presence indication indicates that there is still at least one UE in the energy saving state present in the coverage area of the collective beam and hence the collective beam should be kept active. When the network receives a presence indication, it should toggle the RS that it transmits. Preferably the network immediately sends a toggled RS, in addition to the regular RS transmission occasions, in order to immediately indicate to other UEs that a presence report has been received. An additional condition for toggling the RS when receiving a presence indication is that a minimum time equal to the minimum value of the presence reporting timer (i.e. T+t_min) has elapsed since the last toggling of the RS or since the collective beam was activated.

If the network, in particular the AN, does not receive any presence indication during a certain time T_timeout, it may choose to deactivate the collective beam, i.e. stop sending the reference signals in the collective beam. T_timeout could, e.g. be set to T_timeout=N_timeout×T (where N_timeout is an integer e.g. set to 4) or T_timeout=N_timeout×(T+t_max) (where N_timeout is an integer, e.g. set to 3).

Several examples are feasible providing implementation examples of the above-described options in detail and/or further enhancements to the general inventive schemes. In particular, general examples are first briefly mentioned below and more detailed examples are given afterwards.

In one example, the reference signal provides the possibility for the UE to synchronize with the network in terms of achieving time and frequency offset estimations.

In one example, the UE transmits its presence indication using uplink (UL) transmission resources dedicated for this purpose.

In one example, the UE transmits its presence indication using PRACH resources, i.e. UL transmission resources dedicated for transmission of random access sequences (such as random access preambles). Optionally, these PRACH resources could also be used by UEs requesting access to the network, e.g. to switch from an energy saving state to an active state. In such cases the concerned UE would select another sequence (e.g. another random access preamble) than the one(s) dedicated for presence reporting.

In one example, the UE's presence indication, i.e. indication of UE's presence, has the form of an UL synchronization signal.

In one example, the UE's presence indication has the form of a Zadoff-Chu sequence or a sequence with similar properties. This allows the network to detect the indication of presence, even if multiple UEs send the sequence in the same time slot. However, the network might not be aware that it was sent from more than one UE.

Presence reporting is not limited to the uplink. It is also feasible that an AN in which the UE was previously located informs a neighbouring AN that the UE moved or must have moved in the coverage area of a beam of the neighbouring AN.

As mentioned above, the AN may transmit the control signaling message with instructions about the collective beam repeatedly in the collective beam as long as the collective beam is active. This serves the purpose of instructing new-comers, i.e. UEs in energy saving state which have arrived at the coverage area of the collective beam (or otherwise entered the energy saving state in the coverage area of the collective beam) after the collective beam was activated and the initial instruction message was sent.

In one example, repeated transmissions of the control signaling message with instructions about the collective beam are transmitted periodically.

In one example, the AN repeats the transmission of the control signaling message with instructions about the collective beam by transmitting the instruction message in conjunction with every toggling of the RS in the collective beam. Alternatively, or optionally, the AN may transmit the instruction message once (or some other certain number of times) during every toggling/reporting period. In yet another alternative, the instructions are implicitly indicated by the reference signal, i.e. there is a predefined mapping between reference signal and instructions.

In one example, reference signals transmitted in a collective beam are selected from a set of reference signals dedicated for transmission in collective beams. This may be advantageous for new-comers (see above for definition) in the coverage area of the collective beam. If such a new-comer detects a reference signal belonging to the dedicated set, the new-comer knows that it has detected a collective beam and that (provided that instruction messages are repeatedly transmitted in the collective beam) an instruction message related to the collective beam will soon be transmitted from the network. This principle can advantageously be combined with the option to use predefined mappings between reference signals and the instructions to apply in the collective beam as described below.

In the following, methods for activation of a beam, e.g. collective beam, are explained. In one method, the AN knows that the collective beam it activates is needed by UE(s) in the beam's coverage area, i.e. it knows that there is at least one UE in energy saving state in the coverage area of the new collective beam. The other method is used when the AN is not aware of any UE presence in the coverage area of the collective beam but there may (or may not) be UEs needing a collective beam to be activated, i.e. in essence to "probe" for available UEs needing the collective beam.

Activation of a Collective Beam the Network Knows is Needed

This method is used when the network knows that the collective beam it activates is needed. It is thus straightforward and comprises sending the initial control signaling message with instructions related to the collective beam and activating the reference signal transmissions in the collective beam.

Cases where this method should be used comprise the following three examples:

Knowledge of the UE's Location:
  A UE for which the network has maintained a (more or less) dedicated, typically rather narrow beam goes into the energy saving state. In this case the network has a good notion of the UE's location and hence knows which suitable collective beam to activate (FIG. 4). This may include that the network explicitly switches a UE from an active state (or some other state) to an energy saving state and that a UE (implicitly) times out of an active state (or some other state) and goes to an energy saving state. In particular, the example of FIG. 4 illustrates that the network tracks a UE in an active state with a narrow beam, deactivates the narrow beam when the UE is switched to an energy saving state and activates a collective beam to support the UE in the energy saving state.

Indication that Another Beam with Poor Reception Already Exists for the UE:
  A UE using another active collective beam indicates poor reception of that collective beam, as illustrated in FIG. 5. In particular, the example of FIG. 5 illustrates a UE in the energy saving state on its way out of coverage of a collective beam which reports the worsened reception to the AN, and triggers the AN to activate a new collective beam to support the concerned UE. The UE could indicate this by sending a certain sequence, e.g. a (random access) preamble (such as a Zadoff-Chu sequence), or some sequence with similar properties. Such an indication could be transmitted independently of the presence reporting timer in the beam, i.e. utilizing any transmission resource available for uplink transmission of such a sequence. The network may configure the UEs covered by the collective beam with this sequence (which would be common to all the UEs covered by the collective beam) in the same signaling message as is used to inform the UEs of the reference signals of the collective beam and the sequence to use when reporting presence, i.e. the control message that is sent when a collective beam is activated (and preferably periodically repeated as long as the collective beam remains active). This signaling message or control signalling message may optionally also include indications of uplink transmission resources that may be utilized for this purpose (which hence may include more/other transmission resources than the ones to be used for presence reporting). When the network receives such an indication of poor reception, it uses the angle of arrival (possibly combined with the timing) of the received sequence transmission from the concerned UE to select (and possibly adapt) a new collective beam to activate for the concerned UE (unless this/such a beam is already active and available). The network may explicitly inform the UE, e.g. by responding to the transmitted sequence (e.g. in a manner similar to the random access procedure) or let the UE blindly search for the new/alternative beam.

Request of the UE for Activation of the Beam:
  One could also design a scheme by which any UE could request activation of a collective beam. For instance, there could be certain uplink transmission resources constantly allocated for such requests, wherein the request could have the form of a certain sequence, such as a certain random access preamble. The AN could use the angle of arrival (possibly combined with the timing) of the received sequence transmission from the concerned UE to select (and possibly adapt) a new collective beam to activate for the concerned UE (unless this/such a beam is already active and available).

Activation of a collective beam that may or may not be needed.

Another scheme for beam activation, which may be used additionally or alternatively to the above knowledge/triggering based scheme could be that the network sporadically or periodically activates for a predetermined time period a collective beam to check for present UEs. During such activation periods the network may use a short report period timer (e.g. with a resulting random period span starting at 0, i.e. with T=0 and t_min=0). If the AN receives an indication of presence from a UE, the collective beam is kept active and the network may and preferably should then change the report timer to a longer value.

UEs which may benefit from this method include UEs whose presence in the coverage area have not been made known to the network and which thus have not triggered activation of a collective beam. Such UEs may include but may not be limited to:
  UEs in energy saving state which move out of another collective beam, but which for some reason did not trigger activation of a new collective beam, e.g. because the UE did not have time to send an indication of poor reception, the UE sent an indication of poor reception but it was not correctly received by the network, or the UE sent an indication of poor reception but the network, e.g AN, misjudged the UE's location and activated a (or relied on an already active) collective beam with a coverage area not including the UE's actual location.

UEs which are in an energy saving state in the 5G system, but which until now have relied on service from LTE or wide-area covering transmissions from access nodes operating on a lower carrier frequency and which now have lost LTE coverage or lost coverage of the lower carrier frequency or which want to switch to receive support for their energy saving state on higher 5G frequency, e.g. in order to enable quicker access to the higher data rates provided by the access nodes operating on higher frequencies.

UEs which are not registered in the 5G network, which power on or move into 5G coverage, may use the collective beam for detection of a 5G AN and for initial access to the 5G network. For instance, if a random access sequence is used for presence reporting, then a UE may utilize the transmission resources otherwise used for presence reporting to send a random access sequence to initiate the initial access (i.e. using another, randomly selected random access sequence than the one used for presence reporting). Note that such UEs may utilize any collective beam in this way, i.e. not only collective beams activated with this scheme of sporadic/periodic "probe" activation.

Several extensions and variations of the above-described embodiments and examples are discussed in the following providing further enhancements to the general inventive schemes.

Restricted Values of the Presence Reporting Timer:

The mechanisms of the above basic solution still allow that after a UE has reported its presence to the network, another UE also reports its presence before the network has been able to prevent this by transmitting a toggled RS. To reduce the number of double-reporting (or multi-reporting) of UE presence from more than one UE the values which the reporting timer is allowed to have within its random range may be restricted to discrete values, such that the possible expiration times are discrete occasions separated by a multiple of a time period P. P should be at least as long as the time needed to allow a UE to receive a RS, determine whether it has been toggled, send a presence indication and the network to react upon the presence indication and transmit a toggled RS. This rule should prevent double-reporting (and multi-reporting) of UE presence, unless two (or more) UEs generate reporting timer values that make their respective reporting timer expire at the same occasion.

An alternative could be to mandate that the allowed values of the presence reporting timer are adapted such that the occasions when the timer can expire match the periodic RS transmissions. With this restriction the timer would always expire right before an RS transmission, so the time to detect the RS is almost negligible at least ideally. If the time between two RS transmissions is set to be larger than the time required for the UE to report and the network to react by transmitting a toggled RS (immediately, an RS transmission in addition to the regular periodic RS transmissions), double-reporting (and multi-reporting) of UE presence should be avoided, unless two (or more) UEs generate reporting timer values that make their respective reporting timer expire at the same occasion. This alternative should enable a shorter period, P, between two allowed timer expiration occasions than the alternative above, which is advantageous.

Predefined Mapping Between RS and Collective Beam Instruction:

Instead of, or possibly in addition to, transmitting explicit instruction messages the instructions could be implicitly conveyed by the RS itself. That is, there may be a predefined mapping between RS and instructions related to the collective beam.

If each RS that may be transmitted in a collective beam has its own predefined mapping definition, then each possible set of collective beam instructions should be mapped to by at least two reference signals, so that two reference signals mapping to the same set of instructions can be used to toggle between in a collective beam.

More mappings could be achieved with the same set of reference signals, if the mappings are defined per pair of reference signals, i.e. that each combination of two reference signals would map to a certain set of collective beam instructions. This would however require that a UE observes both reference signals used in a collective beam, (i.e. it would first have to receive one of them and then wait for the reference signal to be toggled and then receive the other one) before it can derive the instructions related to the collective beam, which is unfavorable.

An advantage of using predefined mappings of RS to collective beam instructions instead of periodically transmitted instruction messages is that a newly arriving UE can immediately derive the instructions to apply in the collective beam once it detects a RS transmission. In addition, the downlink transmission resources otherwise used for the instruction messages are saved.

The predefined mapping could be standardized, preconfigured in the USIM or conveyed through system information.

Accordingly, instructions may be derived from a received RS based on a predefined mapping between the reference signal and a set of instructions.

Using Multiple RS Pairs in a Collective Beam:

The use of mappings between reference signals and instructions to apply in a collective beam, as described above in the previous section, can be used to smoothly change the collective beam instructions. Such a change of instructions would be indicated simply by changing from one pair of reference signals (mapping to one set of instructions) to another pair of reference signals (mapping to another set of instructions).

As described above in the previous section, the RS to instructions mapping could be standardized, preconfigured in the USIM or conveyed through system information. But yet another option is that the network provides these mappings in the instruction message, i.e. in the instruction message the network indicates multiple pairs of reference signals and a set of instructions associated with each of the reference signal pairs. Then, the network may freely switch between these multiple pairs of reference signals to dynamically change the instructions for the collective beam whenever changing conditions call for it.

There are different options for how to handle the UE presence reporting timer in relation to the use of switches between different RS pairs in a collective beam. One option is that every change of RS triggers reset of the presence reporting timer in the UE, irrespective of when the RS switch occurs. Another option is that only switching between reference signals within a pair triggers reset of the reporting timer, whereas switching between reference signals belonging to different pairs does not. A third option is that any switch of reference signal that occurs within the time period wherein a randomly generated reporting timer could expire (i.e. a reference signal switch that occurs between the time T+t_min and the time T+t_max) triggers reset of the reporting timer, but not reference signal switches that occur outside these periods.

UE Specific Presence Reporting:

A variation of or extension to the basic solution could be that the UE's presence indication is specific for each UE. That is, each UE would be allocated a dedicated sequence for presence indication. Accordingly, a message or other signal from the UE giving the indication about the UE's presence may specify the UE based on identification information, e.g. by means of a dedicated sequence.

For the network to allocate a dedicated sequence to a UE, the UE has to be in an active or connected mode, where dedicated communication is possible. This also enables transmitting the control signaling, optionally including the entire collective beam instruction, through higher protocol layers with inband control messages together with any user data transmitted to a UE in the downlink.

With the restriction of allocation of the UE specific reporting sequence when the UE is in an active/connected mode, this feature applies to cases when a UE is switched from an active/connected state to the energy saving state in which the collective beam is used. Such cases include situations where the UE's switch to the energy saving state triggers activation of a collective beam as described above with reference to FIG. 4 as well as when a UE is switched to the energy saving state and there is already a collective beam activated, which the network knows will cover the UE.

It is preferable to use this scheme as a complementing feature in parallel with the method of the basic solution. UEs which arrive at the collective beam without being switched from an active/connected state could still use the method of the basic solution. This could be e.g. new-comers which are already in the energy saving state when they arrive at the collective beam, e.g. a UE that is turned on and UEs coming from the coverage area of another collective beam, (e.g. as described above with reference to FIGS. 4 and 5).

Presence Reporting Augmented with Quality Indication:

A possible variation could be to enable that the UEs in the collective beam not only report presence, but also the perceived beam quality. This could be activated dynamically and typically temporarily through the instructions, e.g. the instruction messages, related to the collective beam. If the instructions are implicitly derived from the reference signals transmitted in the collective beam, as described above, then either the reference signals could be changed to, or chosen already at the activation of the collective beam, reference signals mapping to instructions which include instructions of detailed beam quality reporting or an explicit message could be used to add the beam quality reporting instructions to the instructions already mapped to by the reference signals. Accordingly, a message from the UE giving the indication about the UE's presence may also indicate beam quality.

One way of realizing this feature could be that the network interprets the sequence the UEs use for presence reporting as a random access request and allocates UL transmission resources for the concerned UE to use for transmission of a beam/channel quality report. Another way, which is streamlined but allows less details in the reporting, could be to assign a set of sequences to be used for presence reporting in the collective beam, where each sequence also is associated with a certain (range of) beam/channel quality (which could be defined in various ways using various well-established radio channel quality measures, such as RSRP, RSRQ, SNR, SINR, etc.).

When reporting is activated the activation could comprise that only the (typically) single UE that indicates presence during a reporting period also reports the perceived beam quality. Alternatively, the reporting instructions could include that all UEs that are present in the collective beam should report the beam quality, e.g. at the end of each reporting interval (e.g. when their respective reporting timer expires). Yet an alternative could be that each UE in the collective beam randomly determines whether to report the beam quality at the end of each reporting period.

The network could use the beam quality reports to refine its operation, i.e. applying SON functions, e.g. to investigate the coverage, e.g. to discover poorly covered spots, and/or to adapt the collective beam.

As an example of adaptation of a collective beam, the beam quality reports could be used to adapt the width of the collective beam. If repeated, or frequent, or at least occasionally, e.g. compared to one or more thresholds, beam quality reports indicate poor quality (and the directions from which the reports are received do not indicate that the transmitting UEs are located close to a side border of the collective beam, but rather in the more central directions of the collective beam), the network, in particular the AN, may conclude that the collective beam does not reach far enough unless these UEs have already entered the coverage area of a neighbor AN and consequently make the collective beam more narrow (and thus more far-reaching), e.g. by splitting it in two or more collective beams. If on the other hand the network very seldom, or not for a significant time, receives any beam quality report indicating poor quality in the central directions of the collective beam (except from UEs that are entering the coverage area of a neighbor AN), the network, in particular the AN, may try to gradually widen the collective beam (possibly merging two or more collective beams into one or even switch to omnidirectional transmission of the collective "beam") in order to cover a larger area with a single collective beam.

Presence Reporting without Random Presence Reporting Timer Length:

As an option, or alternative, the UEs in a collective beam could be assigned a presence reporting timer with a non-random length. That is, the presence reporting timer of the UEs would typically expire simultaneously. As a consequence, all UEs would always indicate their presence (since none of them gets to see the RS toggling triggered by another UE's presence indication) and they will all transmit their respective presence indication using the same UL transmission resource, in particular the same time slot. That is, the transmission of the presence indications will be contention based. If several UEs transmit the same presence indication sequence simultaneously, the AN will in most cases be able to detect the indication of presence, without knowing that it was transmitted from multiple UEs simultaneously (as it from the AN's perspective would be equivalent to multi-path propagation of the same transmission from a single UE).

A UE should preferably still observe that the RS is changed, thereby receiving a confirmation that the presence reporting succeeded, before it restarts its reporting timer. The case where the presence reporting fails, e.g. due to interference preventing proper reception at the AN, may be handled in various ways. The preferred way is that the network provides an additional second reporting occasion shortly after the first RS transmission after the "regular" reporting occasion (and this should be described in the instructions associated with the collective beam). If the UE observes that the RS is still the same after its presence reporting, it concludes that the presence reporting failed and then the UE attempts to report its presence at the second reporting occasion. Note that if the "regular" presence reporting succeeds and the RS is changed, then the network does not have to listen for presence reporting at the second reporting occasion, but can use these resources for other purposes.

Another alternative for how to handle the case of failed presence reporting would be that a UE simply has to wait for the next "regular" reporting occasion, i.e. at the expiration of the reporting timer, even if it observes from an unchanged RS that its presence reporting failed, i.e. no additional second reporting occasion is provided with this alternative.

This option serves the purpose of relieving the network from some of the burden to listen for presence indications from UEs, as well as to save some UL transmission resources that would otherwise be allocated to support multiple presence indication occasions. This relief of the network comes at the expense of the UE, which will always have to report its presence at every reporting interval, thereby not being able to reap the benefits of the principle where a single UE indicates presence "on behalf" of all the UEs present in the collective beam.

Note that this option is achievable within the framework of the basic solution by setting t_min=t_max, so that the randomness of the reporting timer length is eliminated.

Instructions Outside of an Instruction Message:

One option could be to convey all or parts of the information in the instruction messages via broadcasted system information, e.g. the Access Information Table, see above-referenced paper by Pal Frenger, et al. (ISBN 978-1-4799-4912-0), instead of in instruction messages. If the information in the system information is only partial, it could be complemented by instruction messages. It could also be possible that instruction messages could be used to override the instructions in the system information, when desired.

SSI Transmission in the Collective Beam:

One option could be to periodically transmit a System Signature Index (SSI) (also called system signature sequence in the above-referenced paper by Pal Frenger, et al. (ISBN 978-1-4799-4912-0)) in a collective beam. The SSI is an index pointing out an entry in the Access Information Table (AIT), which contains the parts of the system information which is crucial for a UE to be able to access the network. The SSI and the AIT are components of the System Control Plane (SCP) concept described in the above-referenced paper by Pal Frenger et al.

SON Function for Adaptation of the Reporting Timer:

One option could be to apply a SON function to the collective beam concept, e.g. such that the network adapts the length of the presence reporting timer to the current (or recent) conditions. For instance, if the network notices that it very seldom can turn off a certain collective beam (because there is almost constantly at least one UE using it), the network can extend the length of the presence reporting timer. If this situation persists, or if it has not been possible to turn off the collective beam for a long time, the network can even choose to make the presence reporting timer infinite. If making the presence reporting timer infinite, it is preferable to temporarily, at least once in a while, go back to a finite presence reporting timer to be able to detect if the situation for which an infinite presence reporting timer is suitable persists or has changed.

Opportunistic Use of Collective Beam for Handover:

A collective beam could, as one option, be used for handover purposes (in addition to its previously described use for UEs in energy saving state). In a beam based high frequency, e.g. 5G, system, it is envisioned that potential target beams for handover would be activated on demand for measurement by the UE and potential handover, if the measurements imply that it would be favorable. If collective beams are used, as described herein, an already active collective beam could opportunistically be used as a potential handover candidate. Instead of, or in addition to, activating one or more potential target beam(s) for UE measurement, the UE could be instructed to measure on the already active collective beam, i.e. to measure the reception quality of the reference signals transmitted in the collective beam. If the measurement results are favorable, a collective beam could be selected as the beam to handover the concerned UE to. After the handover the UE could optionally be switched from the collective beam to a dedicated beam activated to serve the UE, e.g. as a process of beam refinement for the UE.

Information about Transition to Active State in Collective Beam Instructions:

To aid UEs in energy saving state in a collective beam to transit from the energy saving state to an active state, when a UE has a need for it, e.g. due to pending UL data in the UE, information about how access to the network in the collective beam can be performed (e.g. information about PRACH resources, set of random access sequences, such as preambles, to choose from, random access initial transmit power setting, etc.) may be included in the instruction messages transmitted in the UE. Another option is that this information is associated with the reference signals transmitted in the beam together with the instructions related to the collective beam, as described above. Yet another option could be that the information related to access and transition from the energy saving state to an active state is included in a separate message (dedicated for this purpose) regularly transmitted in the collective beam.

For all the above options for conveying the information related to access and transition from the energy saving state to an active state this information would preferable also be included in the system information, e.g. in the AIT (see above-referenced paper by Pal Frenger, et al).

As discussed above, the basic solution presented does not rely on beamforming and a beam can be interpreted in a general sense, where a beam also may be omnidirectional, which essentially means that no beamforming is applied. Nevertheless, it has been discussed that in some systems, e.g. 5G systems, beamforming may be advantageous, in particular in systems which are expected to rely a lot on beamforming to achieve good channel quality (and thus enable high data rates) in reasonably large coverage areas. For example, poor propagation properties for higher frequencies that are expected to be used for 5G systems may occur. In addition, the benefits of some embodiments may be more pronounced in a beam-based system, since using multiple beams to cover the coverage area of an access node may require multiplication of the required signals for supporting UEs in energy saving state.

According to another specific embodiment, a method in an access node for supporting UEs in an energy saving state in a, for example beam-based, wireless communication system comprises transmitting from the access node reference signals in a beam intended for multiple UEs in energy saving state and may further comprise maintaining the beam as long as indications of present UE(s) are received; as well as switching from one reference signal to another when receiving an indication of UE presence in the coverage area of the beam. Optionally, the method comprises the step of sending instructions to the UE(s) in the coverage area of the beam, wherein the instructions inform the UE(s) how (and when) to report presence in the coverage area of the beam.

The instructions may further comprise information to the UE(s) what reference signals to listen for in the beam.

According to another specific embodiment, a method in a UE in an energy saving state in a, e.g. beam-based, wireless communication system comprises obtaining instructions related to a beam transmitted from an access node, wherein the instructions contain information about how (and when) the UE should report its presence in the coverage area of the beam. This method may further comprise generating a random value within an interval indicated in the obtained instructions and starting a timer at the generated random value and then receiving reference signals transmitted from the access node, wherein the UE detects which reference signal was transmitted out of a set of possible reference signals. If observing a switch of the reference signals transmitted by the access node, a new random value within the interval indicated in the obtained instructions is generated and the timer at the new generated random value is restarted. If the timer expires, an indication of presence in the coverage area of the beam in accordance with the instructions received from the access node is sent to the access node. The step of obtaining instructions may include receiving an instruction message from the access node, receiving the instructions in broadcasted system information, retrieving instructions from internal storage (e.g. the USIM) and/or deriving the instructions from a received reference signal based on a predefined mapping between the reference signal and a set of instructions.

Figure 8A:
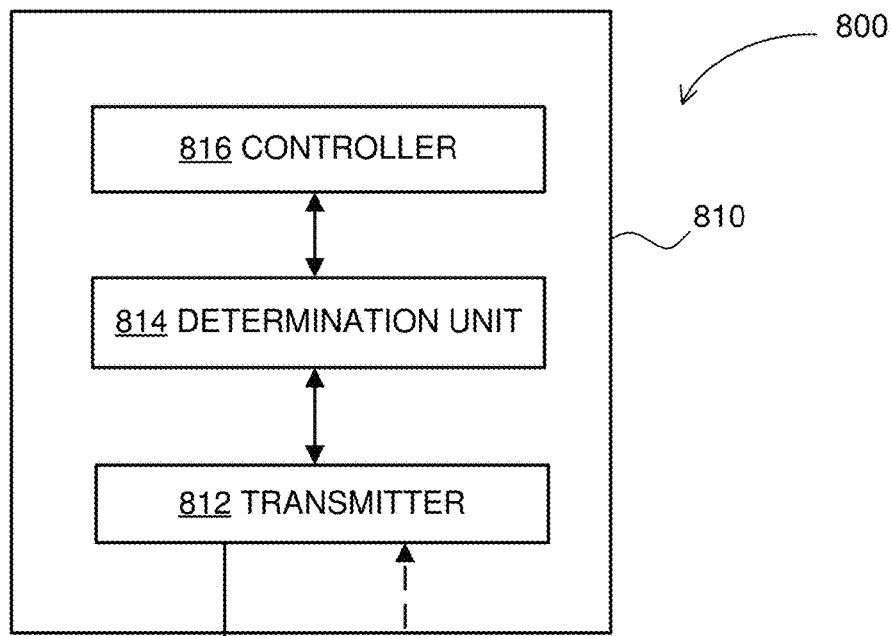
FIGS. 8A and 8B illustrate an access node and UE, respectively, as well as signaling between the two according to an embodiment.
Figure 8B:
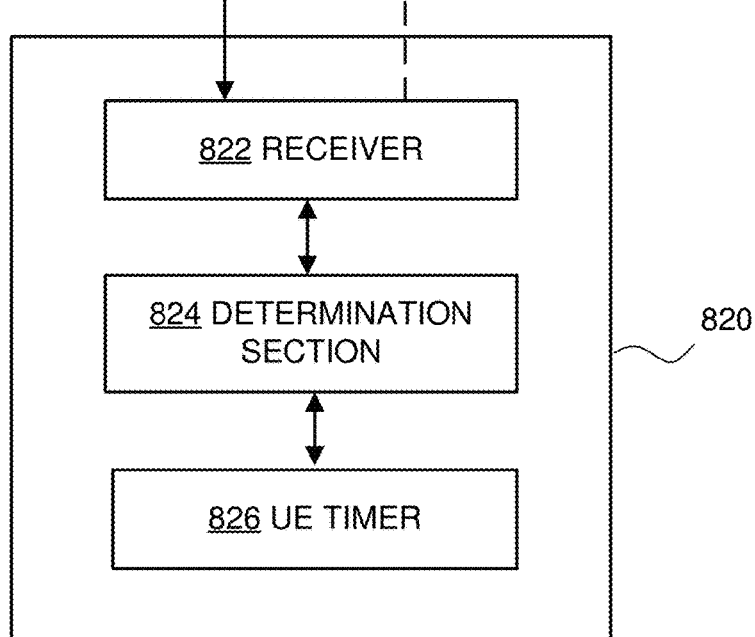

It is referred now to FIGS. 8A and 8B, which illustrate elements of an AN 810 and elements of a UE 820, respectively, the AN and the UE forming the system 800.

Elements, which may also be referred to modules in the following, are adapted to carry out multiple functions, in particular, the steps/functions of the described methods, e.g. presented in FIGS. 2, 3, 6 and 7.

In detail, FIG. 8A illustrates elements of the AN 810 configured to support one or more UEs in a wireless communication system according to an embodiment. The access node may be any kind of base station or base station subsystem including a base station controller or NodeB or eNodeB depending on the generation of the mobile network under consideration. The AN 810 may comprise a (micro) processor to carry out at least some of the above described functions, specifically the functions described with respect to FIGS. 2 and 3.

As can be seen in FIG. 8A, the access node 810 comprises the following elements/modules: a transmitter 812, a determination unit 814, and a controller 816. Specifically, the determination unit 814 and the controller 816 may be tangible elements or software functions running on a processor.

The transmitter 812 is configured to transmit a first reference signal in a beam, whereas details about the RS are provided above.

The determination unit 814 is configured to determine whether the access node 810 received at least one indication about a UE's presence in the coverage area of the beam.

The controller 816 is configured to control a switch from the transmission of the first reference signal to a transmission of a second reference signal by the transmitter 812 if the access node received at least one indication about a UE's presence in the coverage area of the beam. Regarding details of the functions of these elements/modules, it is referred to the above explanation to avoid unnecessary repetition.

Accordingly, the same advantages which are achieved with the above described methods can also be achieved by the AN 810.

FIG. 8B illustrates elements of the UE 820 in a wireless communication system according to an embodiment. The UE may be any kind of terminal with a communication function and is not limited to a mobile device, since also devices which are usually immobile may benefit from implementing communication schemes presented herein. The UE 820 may comprise a processor to carry out at least some of the above described functions, specifically the functions described with respect to FIGS. 6 and 7.

As can be seen in FIG. 8B, the UE 820 comprises the following elements/modules: a receiver 822, a determination section 824, and a UE timer 826. Specifically, the determination section 824 and the UE timer 826 may be tangible elements or software functions running on a processor.

The receiver 822 is configured to receive reference signals in a beam from an access node, such as AN 810, as indicated by the arrow between AN 810 and UE 820. Details about the RS are provided above.

The determination section 824 is configured to determine whether at least two consecutively received reference signals indicate a switch from a first reference signal to a second reference signal.

The UE timer 826 is configured to adapt if a switch is determined, a time period after the expiration of which an indication about the UE's presence in the coverage area of the beam is transmitted. The indication is indicated as "presence indication" by a dashed arrow from the UE 820 to AN 810 in the figure.

Regarding details of the functions of these elements, it is referred to the above explanation to avoid unnecessary repetition. In particular, the receiver 822 and transmitter 812 may be implemented as transceiver so as to receive/transmit RS and/or indications, as shown in wireless communication system 800 of the figure.

Accordingly, the same advantages which are achieved with the above described methods can also be achieved by the UE 820.

As is understood by the skilled person, the AN 810 and UE 820 may include a bus, a processing unit, a main memory, a ROM, a storage device, an I/O interface consisting of an input device and an output device, and a communication interface, such as a transceiver. The bus may include a path that permits communication among the components. Processing unit may include a processor, a microprocessor, or processing logic that may interpret and execute instructions. Main memory may include a RAM or another type of dynamic storage device that may store information and software instructions for execution by processing unit.

UE and AN may perform certain operations or processes described herein. UE and AN may perform these operations in response to processing unit executing software instructions contained in a computer-readable medium. A computer-readable medium may be defined as a physical or a logical memory device. For example, a logical memory device may include memory space within a single physical memory device or distributed across multiple physical memory devices.

The software instructions contained in a main memory may cause the processing unit including a processor, when executed on the processor, to cause the processor to perform operations or processes described herein. Alternatively, hardwired circuitry may be used in place of or in combination with software instructions to implement processes and/or operations described herein. Thus, implementations described herein are not limited to any specific combination of hardware and software.

The physical entities according to the different embodiments of the invention, including the elements, nodes and systems, may comprise or store computer programs including software instructions such that, when the computer programs are executed on the physical entities, steps and operations according to the embodiments of the invention are carried out, i.e. cause processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the terms determination unit or section, controller and UE timer are used, no restriction is made regarding how distributed these elements may be and regarding how gathered these elements may be. That is, the constituent elements may be distributed in different software and hardware components or other elements for bringing about the intended function. A plurality of distinct elements may also be gathered for providing the intended functionalities.

Further, the elements of the AN or UE or system may be implemented in hardware, software, Field Programmable Gate Arrays (FPGAs), Application Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

ABBREVIATIONS

3GPP 3rd Generation Partnership Project
5G 5th Generation
AIT Access Information Table
AN Access Node
LTE Long Term Evolution
MAC Medium Access Control
MRS Mobility Reference Signal
PRACH Physical Random Access Channel
RNTI Radio Network Temporary Identifier
RRC Radio Resource Control
RS Reference Signal
RSRP Reference Signal Received Power
RSRQ Reference Signal Received Quality
SCP System Control Plane
SINR Signal to Interference and Noise Ratio
SNR Signal to Noise Ratio
SON Self-Organizing Network
UE User Equipment
UL Uplink
USIM Universal Subscriber Identity Module

The invention claimed is:

1. A method for supporting user equipment (UEs) in a wireless communication system, the method comprising:
   at an access node:
      determining whether an indication about a UE's presence in a coverage area of a beam transmitted by the access node has been received from the UE; and
      deactivating the beam responsive to determining that no indication has been received from the UE within a first predetermined time period.

2. The method of claim 1 further comprising switching from transmitting a first reference signal in the beam to transmitting a second reference signal in the beam responsive to determining that the indication from the UE has been received.

3. The method of claim 1, further comprising maintaining the beam for a second predetermined time period if a UE's presence is detected by the received indication.

4. The method of claim 1, further comprising transmitting instructions to one or more UEs in the coverage area of the beam, wherein the instructions indicate to the one or more UEs:
   which reference signals the one or more UEs have to listen to in the beam; and/or
   when to indicate to the access node the presence of the UE's in the coverage area of the beam.

5. The method of claim 1, further comprising activating the beam for reference signal transmission based on:
   knowledge of the UE's location;
   an indication that another beam with poor reception already exists for the UE; and/or
   a request of the UE for activation of the beam.

6. The method of claim 1, further comprising activating the beam for reference signal transmission sporadically or periodically for a predetermined time period to check for the presence of the UE.

7. The method of claim 1, further comprising receiving a message from the UE providing the indication about the UE's presence, wherein the message:
   specifies the UE based on identification information; and/or
   indicates beam quality.

8. A method implemented by a user equipment (UE) in a wireless communication system, the method comprising:
   determining whether an access node is switching from transmitting a first reference signal in a beam to transmitting a second reference signal in the beam; and
   based on the determining, adapting a time period after which an indication about the UE's presence in a coverage area of the beam is to be sent to the access node.

9. The method of claim 8 wherein the determining comprises determining whether at least two consecutively received reference signals in the beam indicate the switch by the access node from transmitting the first reference signal to transmitting the second reference signal.

10. The method of claim 8, further comprising:
    obtaining instructions related to the beam transmitted from the access node; and
    transmitting the indication about the UE's presence in the coverage area of the beam to the access node in accordance with the instructions received from the access node responsive to expiration of the time period.

11. The method of claim 10, wherein the instructions indicate to the UE:

which reference signals the UE has to listen to in the beam; and/or how to obtain the time period after the expiration of which the indication to the access node about the UE's presence is transmitted in the coverage area of the beam.

12. The method of claim 10, wherein the instructions are obtained by:

receiving the instructions in an instruction message from the access node;

receiving the instructions in broadcasted system information;

retrieving the instructions from an internal storage; and/or deriving the instructions from a received reference signal based on a predefined mapping between the reference signal and a set of instructions.

13. The method of claim 8, further comprising informing the access node to activate the beam for reference signal transmission by providing:

an indication about the UE's presence in the coverage area of the beam;

an indication that another beam with poor reception already exists for the UE; and/or an explicit request of the UE to activate the beam.

14. The method of claim 8, further comprising sending a message providing the indication about the UE's presence to the access node, wherein the message:

specifies the UE based on identification information; and/or indicates beam quality.

15. An access node supporting user equipment (UEs) in a wireless communication system, the access node comprising:

a transmitter configured to transmit a first reference signal in a beam;

processing circuitry configured to:

determine whether an indication about a UE's presence in a coverage area of a beam transmitted by the access node has been received from the UE; and deactivate the beam responsive to determining that no indication has been received from the UE within a first predetermined time period.

16. A user equipment (UE) of a wireless communication system, the UE comprising:

a receiver configured to receive reference signals in a beam from an access node; and processing circuitry configured to:

determine whether an access node is switching from transmitting a first reference signal in a beam to transmitting a second reference signal in the beam; and adapt a UE timer responsive to determining that the access node is switching, wherein an indication about the UE's presence in a coverage area of the beam is sent to the access node upon expiration of the UE timer.

* * * * *